Sept. 9, 1941.  I. E. McELROY  2,255,567
VARIABLE SPEED POWER TRANSMISSION
Filed Feb. 3, 1941  3 Sheets-Sheet 1
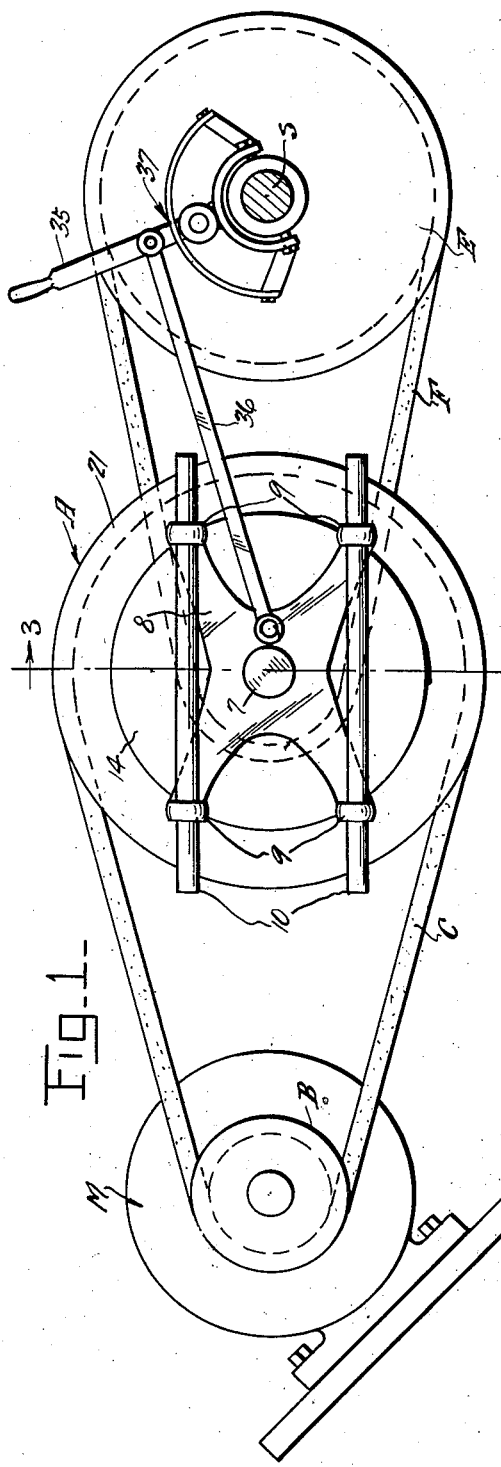
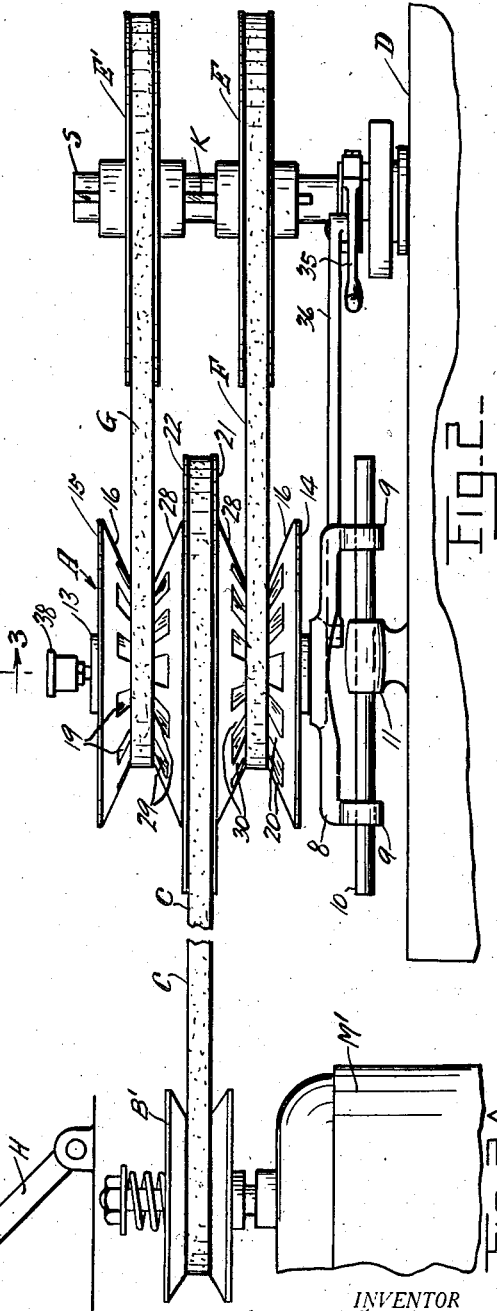
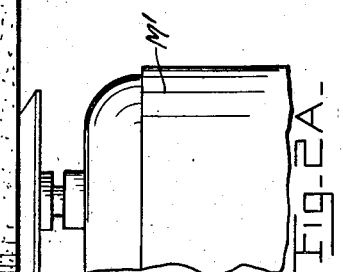
INVENTOR
Isaac E. McElroy

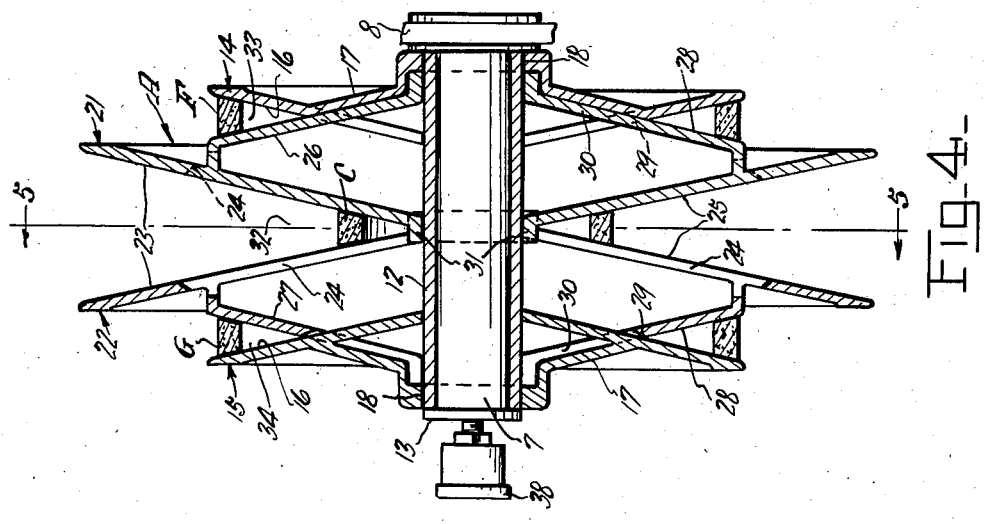
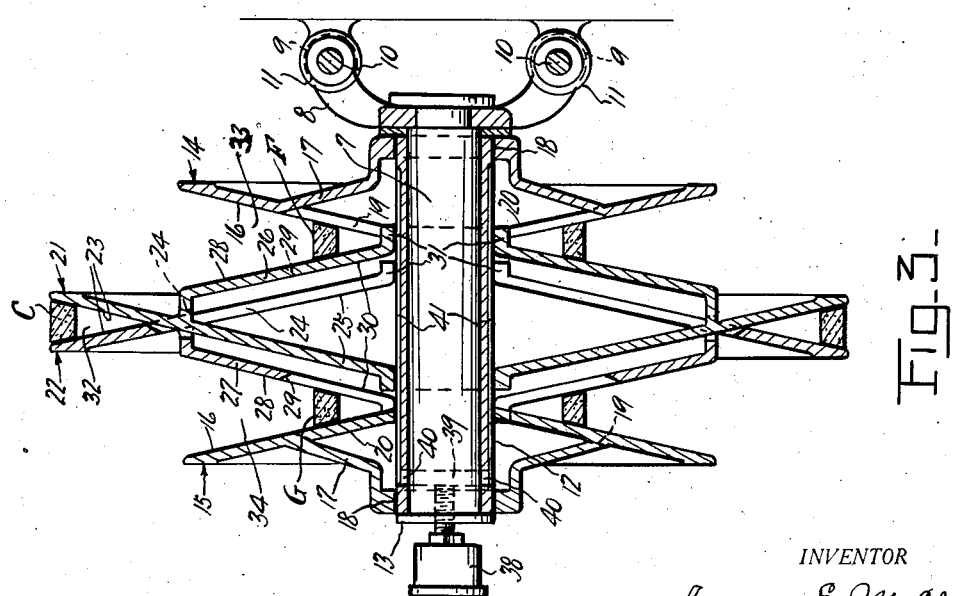

Sept. 9, 1941.  I. E. McELROY  2,255,567
VARIABLE SPEED POWER TRANSMISSION
Filed Feb. 3, 1941   3 Sheets-Sheet 3

INVENTOR.
Isaac E. McElroy

Patented Sept. 9, 1941

2,255,567

UNITED STATES PATENT OFFICE 2,255,567

VARIABLE SPEED POWER TRANSMISSION

Isaac Erwin McElroy, Hollywood, Calif.

Application February 3, 1941, Serial No. 377,221

12 Claims. (Cl. 74—230.17)

This invention relates generally to improvements in variable speed power transmission devices and more specifically to variable speed belt and pulley assemblies for connecting a power or driving unit to machine units and varying the relative speeds between the two.

In the present types of variable speed pulley and belt devices as used for driving drill presses, lathes, milling machines and other machinery which require that the working speeds be varied according to the nature of the work in progress, it has been found that at the slower speeds the driving moment or power delivery of the belts falls off directly as the speed slows. Inasmuch as it is at these slowest speeds that the greatest power is usually needed, this action is a very real disadvantage as will be apparent. The reason for this loss of driving power or power delivery at the slower speeds is due mainly to the fact that the smaller drive pulley diameter presents less working surface to the belt and thus reduces both the frictional driving effect and the rate of belt travel as well as the leverage with which the pulley operates. With the foregoing facts in mind it is the primary object of this invention to provide a pulley and belt assembly wherein the speed of transmission may be varied continuously and in a stepless manner while the machine being driven by the pulley and belts is in operation and wherein a single drive belt is caused to operate against a plurality of driven belts in such manner that the driving moment or power delivery of the belts will remain more nearly constant at all speeds.

A further object of the invention is to provide a pulley and belt assembly of this character wherein a single driving belt is operated in cooperation with a plurality of driven belts all arranged in belt grooves in the pulley in such manner that the driving pressure exerted by the driving belt will transmit directly to the driven belts a frictional effort equal to itself in each, thereby increasing and compounding the power delivery afforded by the pulley to the driven belts. To this end, and for the purpose of varying the speed as between driving and driven belts, the belt grooves are of variable diameter responsive to changes in center distance affecting belt tension, and the members forming the belt grooves are in part movable to bring about a constant degree of lateral pressure on all the belts such as will prevent the diminution of power transfer or driving moment even at the slowest delivery speeds.

Still a further object is to provide an assembly of the foregoing characteristics in which a driving belt or belts is operated between adjustable or floating belt groove forming members on the pulley in such manner that the effective belt groove diameter may be varied by increasing or decreasing the center distances while maintaining the belt tension to thereby vary the speed at which the pulley is driven; and, also, wherein the said floating members operate against or between outer fixed belt groove forming members to provide grooves for receiving a plurality of driven belts and which grooves are varied in their effective belt diameters in inverse relation as the driving belt groove diameter is varied. In this manner the range of possible speed variation is extended while, at the same time, the lateral movement of the adjustable members maintains a constant ratio of frictional contact between the various pulley members and the belts in such manner as to provide a more nearly constant power output at all speeds.

The foregoing and still more specific and detailed objects of the invention will be disclosed in the course of the following specifications, reference being had to the accompanying drawings, wherein:

Figure 1 is a side elevation of my improved belt and pulley assembly as arranged for use as the connecting and power transmission element between a motor and the belt pulleys of a machine of any kind, this drawing also showing an operative means for varying the driving belt tension for the purpose of increasing and decreasing the belt groove diameters and so varying the speed between the motor and machine.

Figure 2 is an edge view of the structure shown in Figure 1 and showing also a fragment of the machine driven by the belts.

Figure 2A shows a motor with a variable pulley.

Figure 3 is an enlarged diametrical cross section through the pulley assembly on the line 3—3 in Figure 1 and showing the driving belt groove at largest diameter and the driven belt grooves at smallest diameter.

Figure 4 is a view similar to Figure 3 but showing the driving belt at smallest diameter and the driven belt grooves at largest diameters.

Figure 6:
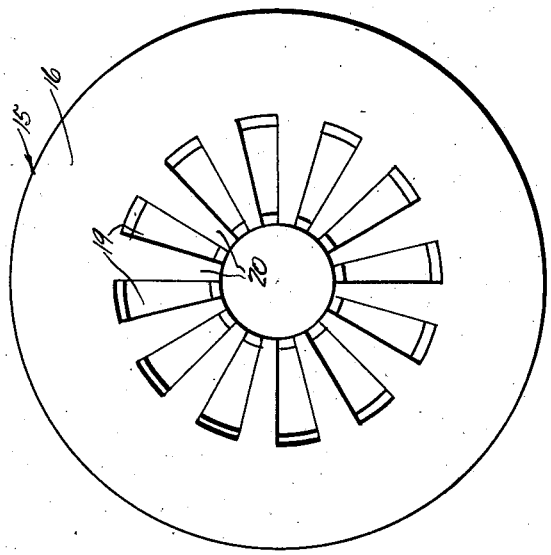
Figure 6 is an inside elevation of one of the fixed belt groove forming members alone.
Figure 5:
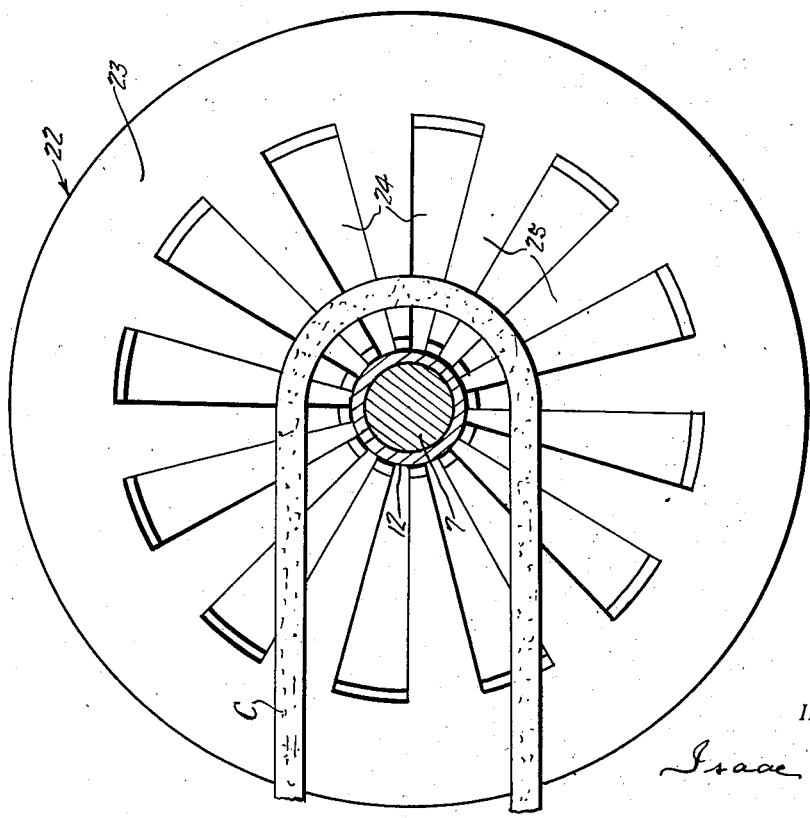
Figure 5 is a cross section along the line 5—5 in Figure 4 showing an inside elevation of one of the adjustable belt groove forming members and a portion of the driving belt.

Referring now with more particularity to the drawings my invention is shown for the purpose of exemplification as the power transmission means between a motor M and the drive or quill shaft S of a drill press D. In the arrangement shown my pulley structure, designated generally at A, is located between the motor M and the shaft S upon a pulley shaft or countershaft 7 extended in parallelism with the axes of both parts M and S. This shaft 7 is extended rigidly from a spider or supporting yoke 8 which is formed with eyes 9 receiving spaced and parallel carrier rods 10 and these rods are in turn slidably received in eyed studs 11 affixed to the side of the press D. The structure thus is such that the entire pulley assembly A may be moved toward and away from the motor M and shaft S and the purpose of this movement will be hereinafter pointed out in detail.

A bearing sleeve 12 is journaled on the shaft 7 and is held against axial displacement thereon by the end collar 13. The pulley proper then comprises a pair of outer belt groove forming members 14 and 15 which are of trunco-conical form and so arranged and mounted as to present the oppositely inclined belt engaging faces 16 at their inner sides. These cones 14 and 15 are rigidly and non-rotatably mounted at the ends of the bearing sleeve 12 by means of outwardly inclined annular flanges 17 which in the present instance are shown as pressed on the sleeve as indicated at 18. The inner circumferential portions of the cones 14 and 15 are provided with spaced and radially extended slots 19 defining intervening spokes 20, the purpose of which will presently appear.

Slidably mounted on the bearing sleeve intermediate the aforesaid fixed cones 14 and 15 are two inner, adjustable or floating belt groove forming members or cones designated generally at 21 and 22. These inner members are also of trunco-conical shape and include the inner inclined belt engaging faces 23 which are, as shown, of substantially greater diameter than the outer members 14 and 15 and are likewise radially slotted at their inner circumferential portions at 24 forming the spokes 25. Also provided on these inner members 21 and 22 are the outer, oppositely inclined belt engaging, trunco-conical flanges 26 and 27 having the belt engaging faces 28 turned toward the aforesaid faces 16. These parts 14, 15, 26 and 27 are all substantially of the same diameter as shown and the flanges 26 and 27 have the radial slots 29 defining spokes 30. To afford a wider bearing surface between the floating cones 21 and 22 and the sleeve 12 the inner margins of the cones are extended in the form of bearing rings or flanges 31 in the manner shown.

The foregoing parts of the pulley are arranged on the bearing sleeve 12 in the order described and in operation the spokes 20 of the outer cones 14 and 15 interlace or interdigitate with the spokes 30 of the inner cones 21 and 22 so as to establish a driving connection between the cones and cause the whole assembly to rotate with the sleeve 12. In similar manner the spokes 25 of the inner cones 21 and 22 interlace and complete the driving connection between parts and this interlacing effect is maintained at all times even though the inner cones are moved axially together or apart between the outer cones. The various belt engaging faces 16, 23 and 28 of the cones thus define and form a central driving belt groove 32 and two laterally disposed driven belt grooves 33 and 34 all of V-shape as clearly shown.

The motor M is provided with a single drive pulley B aligned with the center belt groove 32 of my pulley assembly A and a driving belt C of V-shaped cross section is trained over this pulley B and around the groove 32 in such manner that movement of the belt by the motor causes a frictional driving contact to be exerted on the belt engaging faces 23 of the inner, floating cone sections 21 and 22. Through the interlacing spokes connecting the cones this driving force is applied to the sleeve 12 and the pulley assembly A as a whole. For transferring this driving force to the shaft S a pair of spaced driven pulleys E and E' are mounted on the shaft and driven belts F and G, also of V-shaped cross section, are trained over these pulleys and the belt grooves 33 and 34 with which the pulleys are aligned. The inclined faces 16 and 28 of the inner and outer cones 14—15 and 21—22 thus establish a driving contact with these belts F and G causing them to rotate the pulleys E and E' and, of course, the shaft S.

If the tension of the driving belt C is now increased by a means to be described, this belt will exert a spreading effect on the inclined faces 23 of the floating cones 21 and 22 such as will cause these cones to move apart in an axial direction along the bearing sleeve 12 thus widening the belt groove 32 to such extent that the effective diameter thereof will be decreased. This spreading effect of the floating cones is accompanied by a retraction or decrease in the width of the belt grooves 33 and 34 causing an increase in their effective diameters. In this manner then the ratio between driving and driven belt diameters may be varied constantly within the limits imposed by the diameters of the pulley parts and so that the relative speeds between the motor M and shaft S may be varied and controlled as may be desired. The pulleys E and E' are slidably keyed or splined on the shafts as indicated at K so that they may maintain their alignment with the belt grooves 33 and 34 at all times.

It will be apparent that in order to maintain the driven belts F and G at a constant tension as the effective diameters of their grooves 33 and 34 are varied it is necessary that the entire pulley assembly A be moved toward and away from the pulleys E and E' in order to vary the span of the belts. The hereinbefore described mounting of the countershaft 7 permits this action and for convenience in so operating the pulley assembly, as well as to lock the same in any adjusted position, I provide a hand lever 35 pivotally mounted on the shaft S and connected to the spider 8 by a link 36 so that by swinging this lever the spider and the entire pulley assembly may be reciprocated in the studs 11 as may be required. This lever 35 has a friction locking mechanism 37 of any conventional form for releasably securing it in its adjusted position. This adjustment of the pulley, aside from its function of maintaining the tension of the driven belts, also may serve as the prime actuating medium for bringing about and controlling the variations in speed afforded by the pulley assembly since movement of the pulley away from the motor M will cause an increase in the tension of the drive belt C as well as a reduction in the tension of the driven belts F and G such as will reduce the speed transmitted to the shaft S and vice versa. In order to keep the driving belt C at a constant tension the motor M may be mounted on a hinged supporting plate H so arranged that the weight of the motor (supplemented by a spring if needed, will cause it to move away from the pulley assembly A when the belt tension is reduced; or, in lieu of this arrangement, the motor might be provided with a spring actuated variable speed pulley such as disclosed in Patent #2,050,358 in such a manner as to take up the belt slack and at the same time extend the range of possible speed variations, and increase the tension of the belt with consequent greater power delivery at slower speeds and heavy loads. This structure is diagrammatically illustrated in Fig. 2A showing the motor M' provided with a variable pulley B' carrying the driving belt C.

It may here be noted that the belt tension while being, as stated, increased or decreased to bring about the variation in the effective belt groove diameters in the process of varying the speed of transmission, is not accompanied by any appreciable corresponding variation in the power transmission or delivery afforded by the assembly. This is for the reason that a constant, lateral, frictional driving contact is maintained between the respective pulley faces and the belts at all times. In this connection it may be pointed out, and herein lies what I have found to be a very important and advantageous feature of my pulley assembly, that the lateral pressure and driving contact exerted by the driving belt C against the floating cones 21 and 22 is transmitted equally to both the driven belts through the axial movement of the cones and resulting pressure directly on the driven belts. It is this action which prevents the diminution of the driving moment or power delivery of the assembly when adjusted to its slower speed positions wherein the driving belt groove diameter is reduced.

While the driving contact established by the spreading action of the floating cones 21 and 22 under influence of increases of the driving belt tension is distributed equally to both driven belts it will be noted that the amount or degree of this spread is divided between the driven belt grooves so that the effective diameters thereof vary only half as much as that of the driving belt groove. Applying the principle of leverages that if the distance of load must be lifted is halved, then double the load may be lifted with a given power, it will be evident that the pull or driving force applied to each driven belt F and G will equal the pull or driving force exerted by the driving belt C. To make this action clearly understood, note that the driving belt stays in alignment moving inward on a line at right angle with the axis, line $xx$ in Figure 4, therefore each side of the drive belt exerts energy from an inclined plane or wedge of 17½ degrees against the full 35 degrees of incline upon the driven belts. Lay something over one half of Figure 3 or 4 on the line $xx$ and its principle will immediately become understandable. In the reverse action of the pulley assembly (away from the shaft S) the opposite effect takes place and the driven belts force the driving belt outwardly twice the distance that they themselves move inwardly.

The constant ratio of delivered power at all speeds as made possible by the assembly here provided makes it particularly suitable for use on drill presses and other machine tools where the tool speed must be varied often, and the heavy drag is at the slower speeds. Heretofore, in other variable speed drives with which I have been aware, the variation of speed has either been limited to predetermined and relatively abrupt steps or it has been necessary to stop the machine in order to vary the speed. This is in addition to the loss of driving power at the slower speeds hereinbefore referred to. By the use of this invention however not only is a stepless variation of speed while the driven machine is in operation made possible, but this is done without loss in delivered power at even the slowest speeds. For this reason belt transmission may be used in installations where only gears or chains are at present used and much slower belt speeds may now be used where this would be of advantage.

It will be readily evident that, in lieu of hinging the motor base as shown and described, the requisite tension may be afforded the driving belt C by means of an idler pulley (not shown) engaging one span of the belt. Also several variations in the arrangement of the adjusting means for the pulley assembly will suggest themselves such as other locations for the hand lever 35, remote control of pulley position and the like. Such variations are considered to lie within the scope of this disclosure.

Another possible variation in the pulley structure itself would be the provision of additional floating cones or belt groove forming members which would make it possible to drive or energize four driven belts by the single driving belt. Or more driving belts might be grouped to drive a plurality of driven belts for greater power delivery.

It will be noted that an oil cup 38 is screwed into the outer end of the countershaft 7 and communicates with a diametrically extended oil passage 39 cut in the shaft. The bearing sleeve 12 then has diametrically opposed oil ports 40 so located that they will register with the passage 39 as the sleeve rotates and allow oil to feed out to the exterior of the sleeve. Shallow, longitudinally extended grooves 41 cut in the outer surface of the sleeve then conduct this oil to the bearing portions 31 of the cones 21 and 22 so as to lubricate them and facilitate their sliding motion along the sleeve.

It is understood that suitable modifications may be made in the structure as disclosed, provided that such modifications fall within the spirit and scope of the appended claims. Having thus fully illustrated and described my invention, what I claim as new and desire to secure by Letters Patent is:

1. A pulley-and-V-belt apparatus for the transmission of power from a motor to a machine over a wide range of speeds and torques, said apparatus comprising a variable diameter driving pulley mounted on the motor, a countershaft disposed between the driving pulley and the machine, a multiple pulley structure rotatably mounted on said countershaft, said pulley structure comprising fixed end sections, and a pair of floating cone sections operatively disposed between the end sections, said floating cone sections each cooperating with the end sections and with each other to define a plurality of belt receiving grooves, one of said grooves receiving a high speed driving belt from the driving pulley and the other grooves carrying belts for delivering power to the machine; and means for adjusting the position of the countershaft.

2. A pulley-and-V-belt apparatus for the transmission of power from a motor to a machine over a wide range of speeds and torques, said apparatus comprising a variable diameter driving pulley mounted on the motor, a countershaft disposed between the driving pulley and the machine, a multiple pulley structure rotatably mounted on said countershaft, said pulley structure comprising a pair of fixed end sections and a pair of double-faced floating intermediate sections, the adjacent faces of said intermediate sections forming a variable diameter pulley receiving a high speed driving belt from the driving pulley and the opposite face of each said intermediate section cooperating with the corresponding end section to form a variable diameter pulley carrying a belt for delivering power to the machine; and means for adjusting the position of the countershaft.

3. A pulley-and-V-belt apparatus for the transmission of power from a motor to a machine over a wide range of speeds and torques, said apparatus comprising a variable diameter driving pulley mounted on the motor, a countershaft disposed between the driving pulley and the machine, a multiple pulley structure rotatably mounted on said countershaft, said pulley structure comprising fixed end sections, and a pair of floating interlocked cone sections operatively disposed between the end sections, said floating cone sections each cooperating with the end sections and with each other to define a plurality of belt receiving grooves, one of said grooves receiving a high speed driving belt from the driving pulley and the other grooves carrying belts for delivering power to the machine; and means for adjusting the position of the countershaft.

4. A pulley-and-V-belt apparatus for the transmission of power from a motor to a machine over a wide range of speeds and torques, said apparatus comprising a variable diameter driving pulley mounted on the motor, a countershaft disposed between the driving pulley and the machine, a multiple pulley structure rotatably mounted on said countershaft, said pulley structure comprising fixed end sections, and a pair of floating interlocked cone sections operatively disposed between the end sections, adjacent pairs of sections having cooperating interlocking means for rotation in unison, said sections cooperating to define a plurality of belt receiving grooves, one of said grooves receiving a high speed driving belt from the driving pulley and the other grooves carrying belts for delivering power to the machine; and means for adjusting the position of the countershaft.

5. A pulley-and-V-belt apparatus for the transmission of power from a motor to a machine over a wide range of speeds and torques, said apparatus comprising a variable diameter driving pulley mounted on the motor, a countershaft disposed between the driving pulley and the machine, a multiple pulley structure rotatably mounted on said countershaft, said pulley structure comprising a pair of fixed end sections and a pair of floating intermediate sections, the adjacent faces of said intermediate sections forming a variable diameter pulley receiving a high speed driving belt from the driving pulley and the opposite face of each said intermediate section cooperating with the corresponding end section to form a variable diameter pulley carrying a belt for delivering power to the machine; and means for adjusting the position of the countershaft.

6. A pulley-and-V-belt apparatus for the transmission of power from a motor to a machine over a wide range of speeds and torques, said apparatus comprising a variable diameter driving pulley mounted on the motor, a countershaft disposed between the driving pulley and the machine, a multiple pulley structure rotatably mounted on said countershaft, said pulley structure comprising a pair of fixed end sections and a pair of floating intermediate sections, the said intermediate sections having means for interlocking each with the other and each also having means for interlocking with adjacent end sections, the adjacent faces of said intermediate sections forming a variable diameter pulley receiving a high speed driving belt from the driving pulley and the opposite face of each said intermediate section cooperating with the corresponding end section to form a variable diameter pulley carrying a belt for delivering power to the machine; and means for adjusting the position of the countershaft.

7. A variable-diameter-pulley-and-V-belt transmission apparatus comprising a countershaft carrying a plurality of interlocked sections rotatable thereon in unison, the end sections being axially fixed and the remaining sections floating on the countershaft, each pair of adjacent sections defining a variable diameter V belt groove, the belt operating faces of all said sections having a substantially equal inclination to the vertical, a driving belt carried by one pair of adjacent floating sections, and a plurality of driven belts carried by the remaining grooves.

8. A variable-diameter-pulley-and-V-belt apparatus for the transmission of power from a motor to a machine, comprising a variable power pulley connected to the motor, a countershaft disposed between the power pulley and the machine, said countershaft carrying a plurality of interlocked sections rotatable thereon in unison, the end sections being fixed and the remaining sections floating on the countershaft, each pair of adjacent sections defining a variable diameter V belt groove, the belt operating faces of all said sections having a substantially equal inclination to the vertical, a driving belt carried by the power pulley and by one pair of adjacent floating sections, and a plurality of driven belts carried by the remaining grooves and connected to the machine, and means for adjusting the position of the countershaft to vary the effective diameter of the driving groove an amount substantially equal to the sum of the variations of the driven grooves.

9. A variable-diameter-pulley-and-V-belt transmission apparatus comprising a countershaft carrying a plurality of interlocked sections rotatable thereon in unison, the end sections being axially fixed and the remaining sections floating on the countershaft, each pair of adjacent sections defining a variable diameter V belt groove, the belt operating faces of all said sections having a substantially equal inclination to the vertical, a driving belt carried by one pair of adjacent floating sections, and a plurality of driven belts carried by a plurality of the remaining grooves.

10. A variable-diameter-pulley-and-V-belt apparatus for the transmission of power from a motor to a machine, comprising a variable power pulley connected to the motor, a countershaft disposed between the power pulley and the machine, said countershaft carrying a plurality of interlocked sections rotatable thereon in unison, the end sections being fixed and the remaining sections floating on the countershaft, each pair of adjacent sections defining a variable diameter V belt groove, the belt operating faces of all said sections having a substantially equal inclination to the vertical, a driving belt carried by the power pulley and by one pair of adjacent floating sections, and a plurality of driven belts carried by a plurality of the remaining grooves and connected to the machine, and means for adjusting the position of the countershaft to vary the effective diameter of the driving groove an amount substantially equal to the sum of the variations of the driven grooves.

11. A variable-diameter-pulley-and-V-belt apparatus for the transmission of power from a motor to a machine, comprising a yieldable power pulley connected to the motor, a countershaft disposed between the power pulley and the machine, said countershaft carrying a plurality of interlocked sections rotatable thereon in unison, the end sections being fixed and the remaining sections floating on the countershaft, each pair of adjacent sections defining a variable diameter V belt groove, the belt operating faces of all said sections having a substantially equal inclination to the vertical, a driving belt carried by the power pulley and by one pair of adjacent floating sections, and a plurality of driven belts carried by a plurality of the remaining grooves and connected to the machine, and means for adjusting the position of the countershaft to vary the effective diameter of the driving groove an amount substantially equal to the sum of the variations of the driven grooves.

12. A variable-diameter-pulley-and-V-belt apparatus for the transmission of power from a motor to a machine, comprising a yieldable power pulley connected to the motor, a countershaft disposed between the power pulley and the machine, said countershaft carrying a plurality of interlocked sections rotatable thereon in unison, the end sections being fixed and the remaining sections floating on the countershaft, each pair of adjacent sections defining a variable diameter V belt groove, the belt operating faces of all said sections having a substantially equal inclination to the vertical, a driving belt carried by the power pulley and by one pair of adjacent sections, and a plurality of driven belts carried by a plurality of the remaining grooves and connected to the machine, and means for adjusting the position of the countershaft to vary the effective diameter of the driving groove an amount substantially equal to the sum of the variations of the driven grooves.

ISAAC ERWIN McELROY.